United States Patent
Kim et al.

(10) Patent No.: US 8,358,356 B2
(45) Date of Patent: Jan. 22, 2013

(54) IMAGE CAPTURING APPARATUS AND METHOD FOR LIMITING IMAGE BLURRING

(75) Inventors: Sung-Su Kim, Yongin-si (KR); Byung-Kwan Park, Seoul (KR); Dae-Su Chung, Seoul (KR)

(73) Assignees: Samsung Electronics Co., Ltd., Suwon-si (KR); Samsung Electro-Mechanics Co., Ltd., Suwon-si (KR)

( * ) Notice: Subject to any disclaimer, the term of this patent is extended or adjusted under 35 U.S.C. 154(b) by 522 days.

(21) Appl. No.: 12/407,247

(22) Filed: Mar. 19, 2009

(65) Prior Publication Data

US 2009/0244319 A1 Oct. 1, 2009

(30) Foreign Application Priority Data

Apr. 1, 2008 (KR) ........................ 10-2008-0030432

(51) Int. Cl.
*H04N 5/235* (2006.01)
*H04N 5/238* (2006.01)
(52) U.S. Cl. .................... 348/229.1; 348/364
(58) Field of Classification Search ........................ None
See application file for complete search history.

(56) References Cited

U.S. PATENT DOCUMENTS

| | | | |
|---|---|---|---|
| 6,603,508 B1 * | 8/2003 | Hata | 348/229.1 |
| 7,245,320 B2 * | 7/2007 | Kaplinsky et al. | 348/229.1 |
| 7,853,134 B2 * | 12/2010 | Imamura | 396/55 |
| 7,881,595 B2 * | 2/2011 | Jerdev et al. | 396/55 |
| 8,224,176 B1 * | 7/2012 | Pillman et al. | 396/242 |
| 8,248,482 B2 * | 8/2012 | Oks et al. | 348/222.1 |
| 2007/0166020 A1 * | 7/2007 | Quan et al. | 396/52 |
| 2008/0043112 A1 * | 2/2008 | Nikkanen et al. | 348/217.1 |

FOREIGN PATENT DOCUMENTS

| | | |
|---|---|---|
| JP | 2006-166231 | 6/2006 |
| KR | 10-2006-0003466 | 1/2006 |
| KR | 10-2006-0124119 | 12/2006 |
| WO | 2005/027510 | 3/2005 |

* cited by examiner

*Primary Examiner* — Justin P Misleh
(74) *Attorney, Agent, or Firm* — Staas & Halsey LLP

(57) ABSTRACT

Provided is an image capturing apparatus and method, in which the limit of the application of blurring to an input image is determined with the use of a database of recognizable blur levels, and the input image is processed by applying filtering properties corresponding to variations in digital gain and an exposure time. The image capturing apparatus includes a light reception module which receives an optical signal; and an image processing module which adjusts an exposure time-to-digital gain ratio with reference to the amount of light included in the optical signal.

23 Claims, 9 Drawing Sheets

IMAGE CAPTURING APPARATUS AND METHOD FOR LIMITING IMAGE BLURRING

CROSS-REFERENCE TO RELATED APPLICATION

This application claims priority from Korean Patent Application No. 10-2008-0030432 filed on Apr. 1, 2008 in the Korean Intellectual Property Office, the disclosure of which is incorporated herein by reference in its entirety.

BACKGROUND OF THE INVENTION

1. Field of the Invention

The present invention relates to an image capturing apparatus and method, and more particularly, to an image capturing apparatus and method, in which the limit of the application of blurring to an input image is determined with the use of a database of recognizable blur levels, and the input image is processed by applying filtering properties corresponding to variations in digital gain and an exposure time.

2. Description of the Related Art

Devices equipped with cameras such as digital cameras or camera phones have recently become widespread.

A typical digital camera includes a lens and an image sensor. The lens collects optical signals reflected from a subject, and the image sensor then detects the optical signals collected by the lens and converts the detected optical signals into electric image signals. Image sensors are largely classified into a camera tube and a solid-state image sensor. Examples of the solid-state image sensor include a charge-coupled device (CCD) and a complementary metal-oxide semiconductor (CMOS).

In order to properly output an electric image signal, a sufficient amount of light must be provided to the image sensor. If an insufficient amount of light is provided to the image sensor, the quality of an image may deteriorate.

In order to secure a sufficient amount of light, an exposure time or digital gain may be increased. Specifically, the amount of light that can be provided to the image sensor may be increased by increasing the exposure time, or the amount of light that has already been incident upon the image sensor may be amplified by increasing digital gain.

However, an increase in the exposure time is highly likely to result in blurry images, and an increase in digital gain is highly likely to amplify not only the amount of incident light of a subject but also noise.

Therefore, what is needed is a way to determine an optimum exposure time and optimum digital gain, which can effectively compensate for a light shortage while preventing the deterioration of the quality of an image.

SUMMARY OF THE INVENTION

Aspects of the present invention provide an image capturing apparatus and method, in which the limit of the application of blurring to an input image is determined with the use of a database of recognizable blur levels, and the input image is processed by applying filtering properties corresponding to variations in digital gain and an exposure time.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to an aspect of the present invention, there is provided an image capturing apparatus including: a light reception module which receives an optical signal; and an image processing module which adjusts an exposure time-to-digital gain ratio with reference to the amount of light included in the optical signal.

According to another aspect of the present invention, there is provided an image capturing method including: receiving an optical signal; and adjusting an exposure time-to-digital gain ratio with reference to the amount of light included in the optical signal.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

Figure 1:
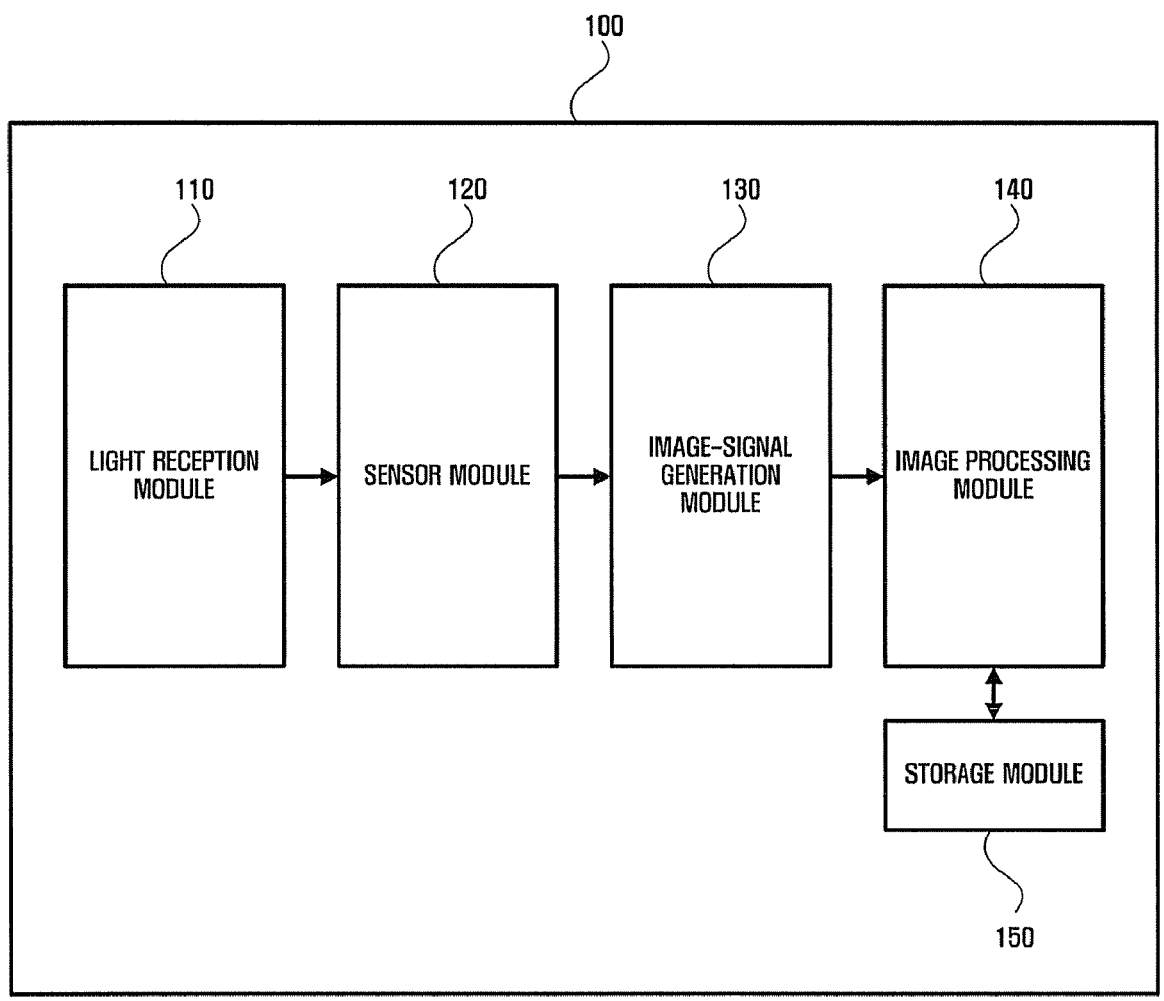
FIG. 1 illustrates a block diagram of an image capturing apparatus according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

The term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

FIG. 1 illustrates a block diagram of an image capturing apparatus 100 according to an exemplary embodiment of the present invention. Referring to FIG. 1, the image capturing apparatus 100 includes a light reception module 110, a sensor module 120, an image-signal generation module 130, an image processing module 140 and a storage module 150.

The light reception module 110 receives an optical signal. For this, the light reception module 110 may include a lens unit (not shown) and a filter unit (not shown).

The lens unit may include at least one lens which collects incident light. The number of lenses included in the lens unit may be altered according to the purpose of the use of the lens unit. The lenses in the lens unit may be arranged on the same plane in various manners. For example, the lenses in the lens unit may be arranged in a straight line or in a matrix.

The filter unit filters optical signals collected by the lens unit. That is, the filter unit may allow only the optical signals that fall within a predetermined wavelength band to transmit therethrough.

The sensor module 120 converts optical signals into electric signals. The sensor module 120 may include at least one pixel region, convert an optical signal incident upon the pixel region into an electric signal and output the electric signal.

The image-signal generation module 130 extracts an accumulated amount of electric charge based on a final value of the electric signal provided by the sensor module 120 during the generation of a frame based on an input optical signal incident upon the pixel region of the sensor module 120, and generates an image signal regarding the input optical signal based on the accumulated amount of electric charge.

The intensity of the electric signal provided by the sensor module 120 may decrease due to an electric discharge. The discharge speed of the electric signal provided by the sensor module 120 may be determined according to the intensity of an input optical signal. Therefore, the image-signal generation module 130 may determine the intensity of an input optical signal based on a final value of the electric signal provided by the sensor module 120 and may thus generate an image signal.

The image processing module 140 adjusts an exposure time-to-digital gain ratio based on the amount of light included in an optical signal. If an insufficient amount of light is included in an input optical signal, the image capturing apparatus 100 may compensate the input optical signal for a light shortage by adjusting an exposure time and digital gain. The image processing module 140 may determine an optimum exposure time-to-digital gain ratio that can prevent the deterioration of the quality of an image and can compensate for a light shortage.

The image processing module 140 may apply one or more filters corresponding to the exposure time-to-digital gain ratio determined by the image processing module 140 to an image signal, thereby removing image defects that may occur due to increases in an exposure time and digital gain. More specifically, as an exposure time increases, an image may become blurrier. As digital gain increases, the amplification of noise may become more likely. Therefore, the image processing module 140 may apply a low pass filter for reducing blurriness and a high pass filter for reducing the probability of noise being amplified to an image signal, thereby removing image defects.

The storage module 150 may include a database of property information of a low pass filter corresponding to an exposure time determined by the image processing module 140 and a database of property information of a high pass filter corresponding to digital gain determined by the image processing module 140.

For example, the storage module 150 may store property information of a filter for an exposure time-to-digital gain ratio of 2:8 and property information of a filter for an exposure time-to-digital gain ratio of 5:5 separately.

The storage module 150 is a module such as a hard disc, a flash memory, a compact flash (CF) card, a secure digital (SD) card, a smart media (SM) card, a multimedia card (MMC) or a memory stick to/from which data can be input/output. The storage module 150 may be included in the image capturing apparatus 100 or in an external device. If the storage module 150 is included in an external device, the image capturing apparatus 100 may also include a communication module (not shown) which communicates with the external device including the storage module 150.

Figure 2:
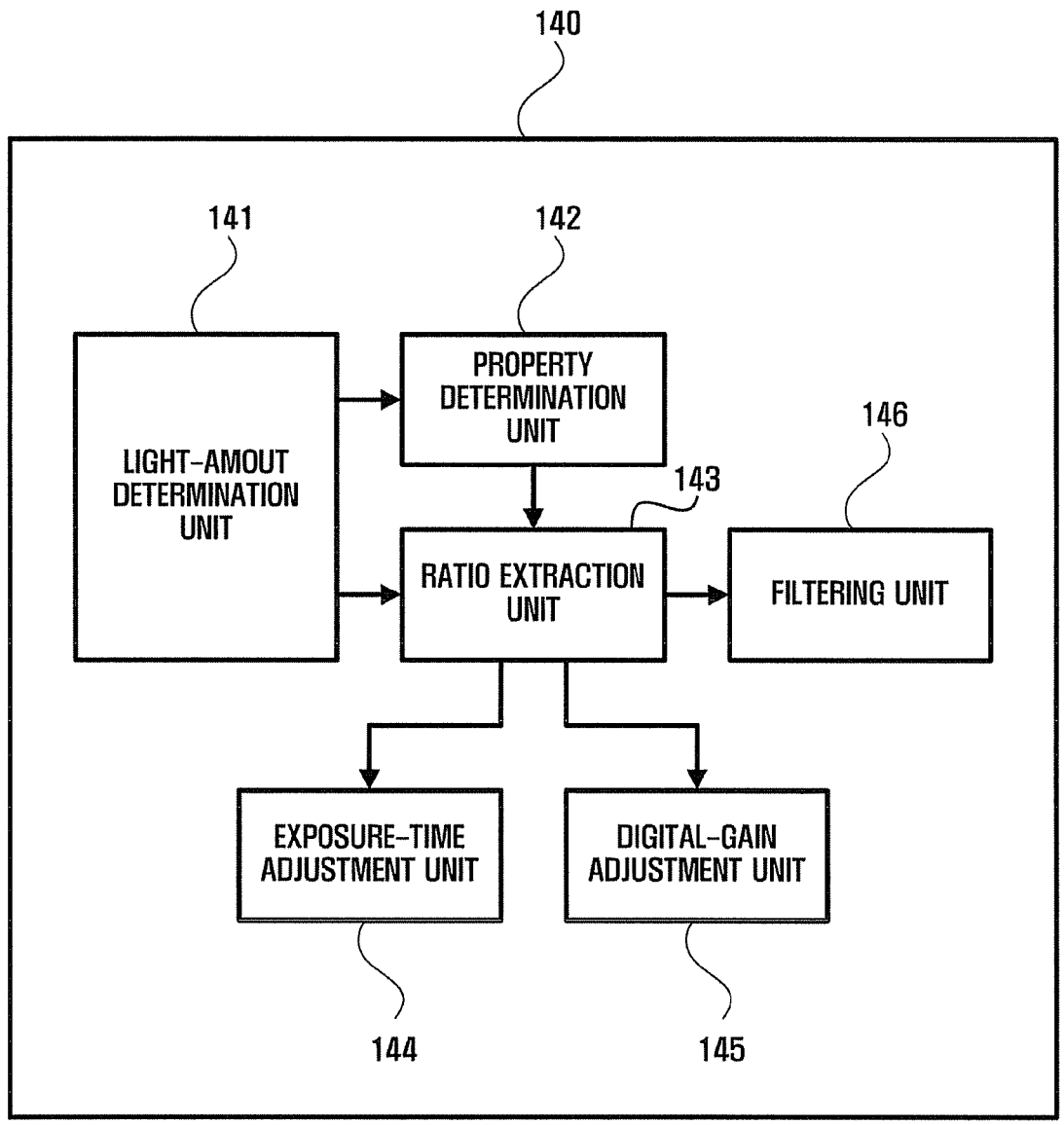
FIG. 2 illustrates a detailed block diagram of an image processing module shown in FIG. 1.

FIG. 2 illustrates a detailed block diagram of the image processing module 140. Referring to FIG. 2, the image processing module 140 includes a light-amount determination unit 141, a property determination unit 142, a ratio extraction unit 143, an exposure-time adjustment unit 144, a digital-gain adjustment unit 145, and a filtering unit 146.

The light-amount determination unit 141 determines the amount of light included in an input optical signal. As described above, the discharge speed of an electric signal provided by the sensor module 120 varies according to the intensity of an input optical signal. The light-amount determination unit 141 may determine the intensity of an input optical signal, i.e., an initial intensity of light, based on the discharge speed of an electric signal provided by the sensor module 120, and an amount of light accumulated during the discharge of the electric signal provided by the sensor module 120.

The light-amount determination unit 141 may estimate an optimum amount of light for the intensity of ambient light and compares the optimum amount of light with the amount of light accumulated during the discharge of the electric signal provided by the sensor module 120. An optimum amount of light for realizing an image may vary according to the intensity of ambient light. Thus, the light-amount determination unit 141 may determine whether the amount of light accumulated during the discharge of the electric signal provided by the sensor module 120 reaches the optimum amount of light estimated for the intensity of ambient light. Information regarding the relationship between the intensity of an optical signal and an optimum amount of light may be stored in the storage module 150.

The property determination unit 142 determines the sharpness of an image configured by an optical signal. More specifically, the property determination unit 142 may determine the sharpness of an image by calculating a discrete cosine transform (DCT) level of the image.

In order to determine the sharpness of an image, the property determination unit 142 may use the distribution of luminance levels in an image. That is, the property determination unit 142 may divide an image into a number of regions having different luminance levels, calculate the DCT levels of the regions, and calculate the DCT level of the whole image based on the DCT levels of the regions.

The ratio extraction unit 143 extracts a recognizable blur level corresponding to a sharpness level determined by the property determination unit 142, and extracts an exposure time-to-digital gain ratio corresponding to the extracted recognizable blur level. The storage module 150 may include a database of a plurality of recognizable blur levels.

Figure 3:
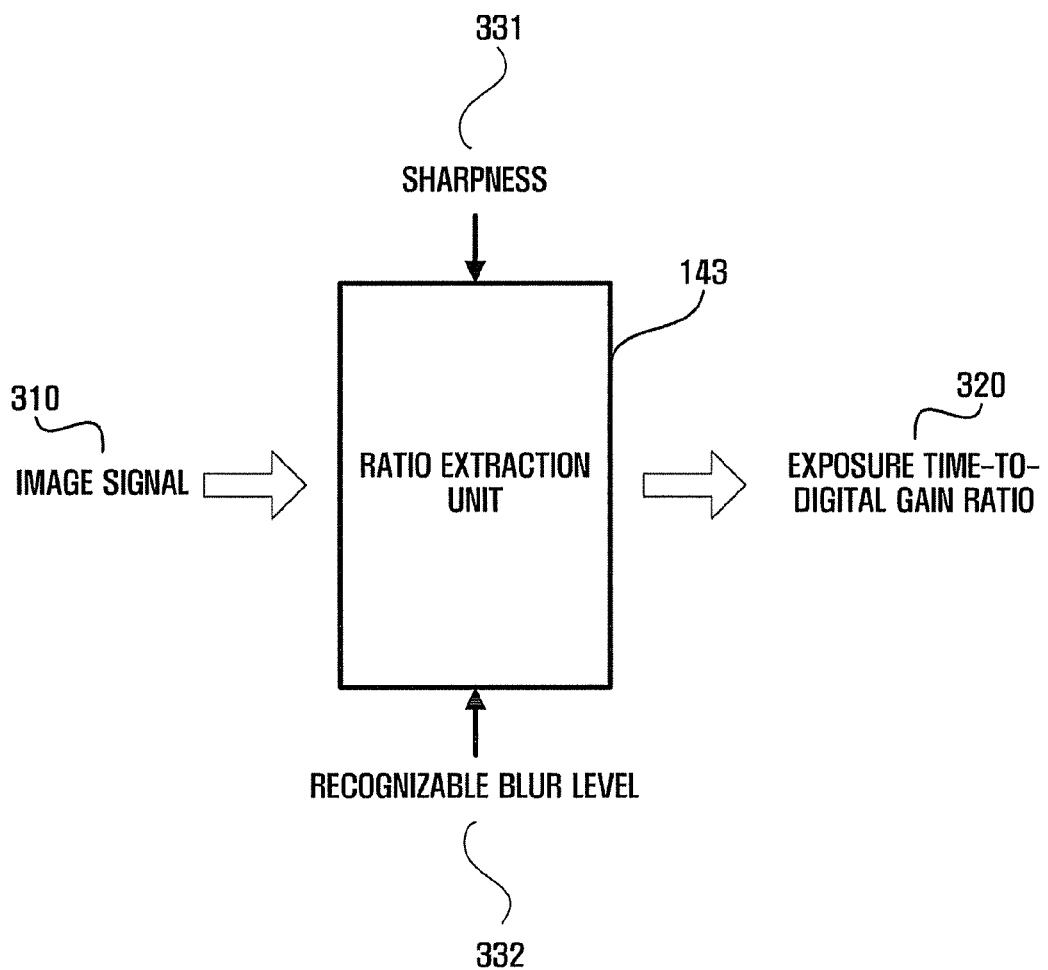
FIG. 3 illustrates a diagram for explaining the operation of a ratio extraction module shown in FIG. 2.

FIG. 3 illustrates a diagram for explaining the operation of the ratio extraction unit 143 illustrated in FIG. 2. Referring to FIG. 3, the ratio extraction unit 143 receives an image signal 310 generated by the image-signal generation module 130. The light-amount determination unit 142 may transmit the image signal 310 to the ratio extraction module 143.

The ratio extraction unit 143 may receive a sharpness level 331 from the property determination unit 142, extract a recognizable blur level 332 corresponding to the sharpness level 331 from the storage module 150, and extract an exposure time-to-digital gain ratio 320 corresponding to the recognizable blur level 332 from the storage module 150.

A recognizable blur level is a maximum blur level that can be tolerated by a user. That is, if a predetermined blur level is applied to an image and a user can recognize the application of the predetermined blur level from the image, the blur level may be a recognizable blur level. The ratio extraction unit 143 may extract a blur level that is not recognizable.

The exposure-time adjustment unit 144 and the digital-gain adjustment unit 145 adjust an exposure time and digital gain, respectively, according to the exposure time-to-digital gain ratio extracted by the ratio extraction unit 143.

The filtering unit 146 extracts a low pass filter and a high pass filter corresponding to the exposure time-to-digital gain ratio extracted by the ratio extraction unit 143 from the storage module 150 and filters the image signal 310 using the low pass filter and the high pass filter.

In general, as an exposure time increases, the properties of blurring become more similar to the properties of Gaussian blurring. Thus, the filtering unit 146 may extract a Gaussian filter as a low pass filter.

The generation of a low pass filter will hereinafter be described in detail. A multi-Gaussian filter having more than one blur level is applied to an image to which no blur level has been applied. The multi-Gaussian filter is obtained by convoluting more than one Gaussian filter. As a result of the application of the multi-Gaussian filter, a plurality of blurred images corresponding to different exposure times are generated. Thereafter, a Gaussian filter for offsetting the differences between the DCT levels of the blurred images is generated, thereby realizing a low pass filter.

The generation of a high pass filter will hereinafter be described in detail. Monochromatic images having different luminance levels each other are filtered by applying a low pass filter for each exposure time, and a multi-Gaussian filter capable of minimizing the DCT level of the filtered image is generated, thereby realizing a high pass filter.

Once a plurality of low pass filters and a plurality of high pass filters are generated in the above-mentioned manner, the low pass filters and the high pass filters may be stored in the storage module 150. Then, a low pass filter and a high pass filter corresponding to the exposure time-to-digital gain ratio extracted by the ratio extraction unit 143 may be extracted from the storage module 150.

A high pass filter may be extracted from the storage module 150 by considering the areas of a number of individual regions of an image. That is, the filtering unit 146 may extract a high pass filter for each of the individual regions in either ascending or descending order of the areas of the individual regions, and then extract a low pass filter that can reduce both blur and noise in the image by being paired with the high pass filter.

Since a low pass filter is extracted from the storage module 150 according to the blur level extracted by the ratio extraction unit 143, a user may not be able to recognize a blur phenomenon from an image obtained by filtering performed by the filtering unit 146.

In addition, since an exposure time-to-digital gain ratio that can compensate for a light shortage is extracted from the storage module 150 and an image is filtered using a high pass filter corresponding to the exposure time-to-digital gain ratio, it is possible to prevent the generation of excessive noise.

Figure 4:
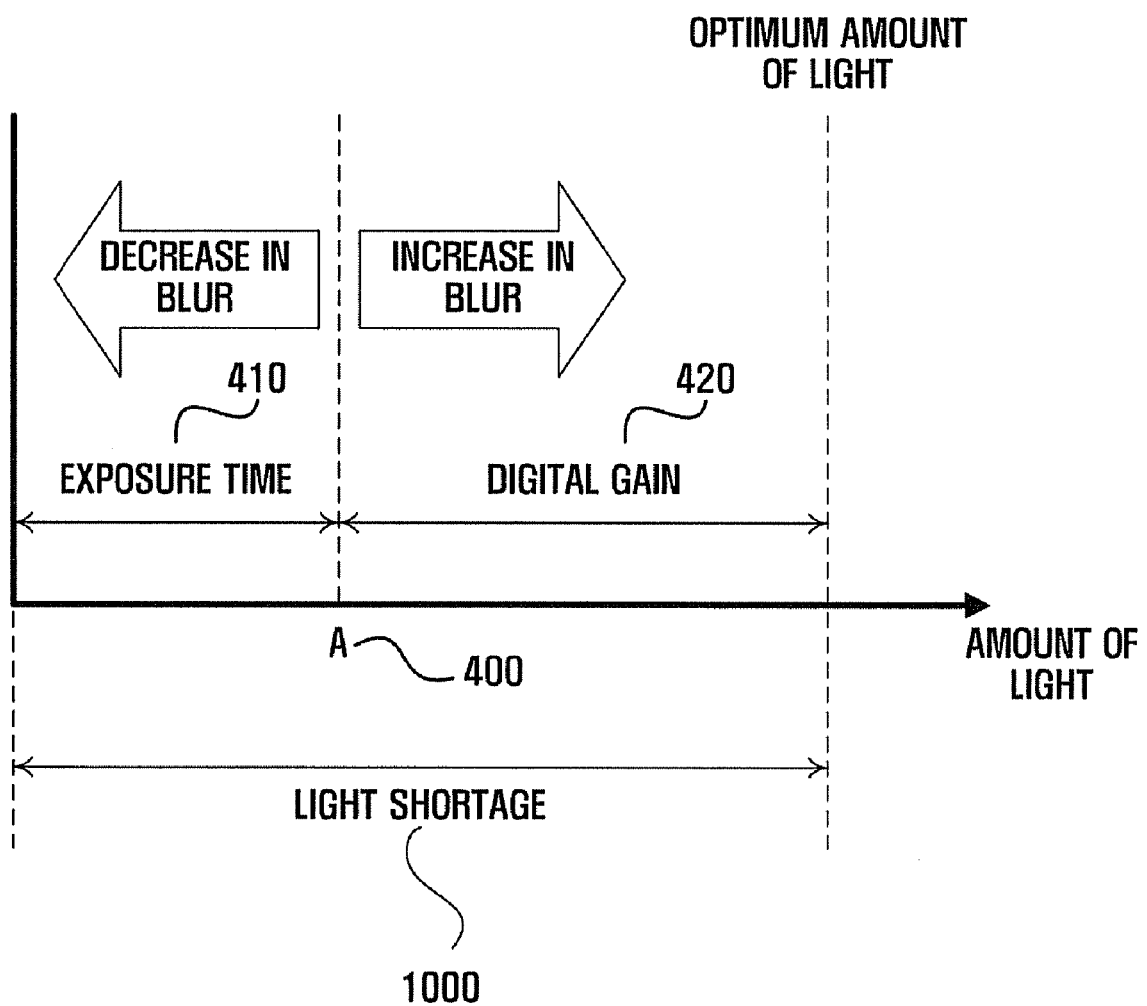
FIGS. 4 through 6 illustrate diagrams for explaining the relationship between an exposure time and digital gain.
Figure 5:
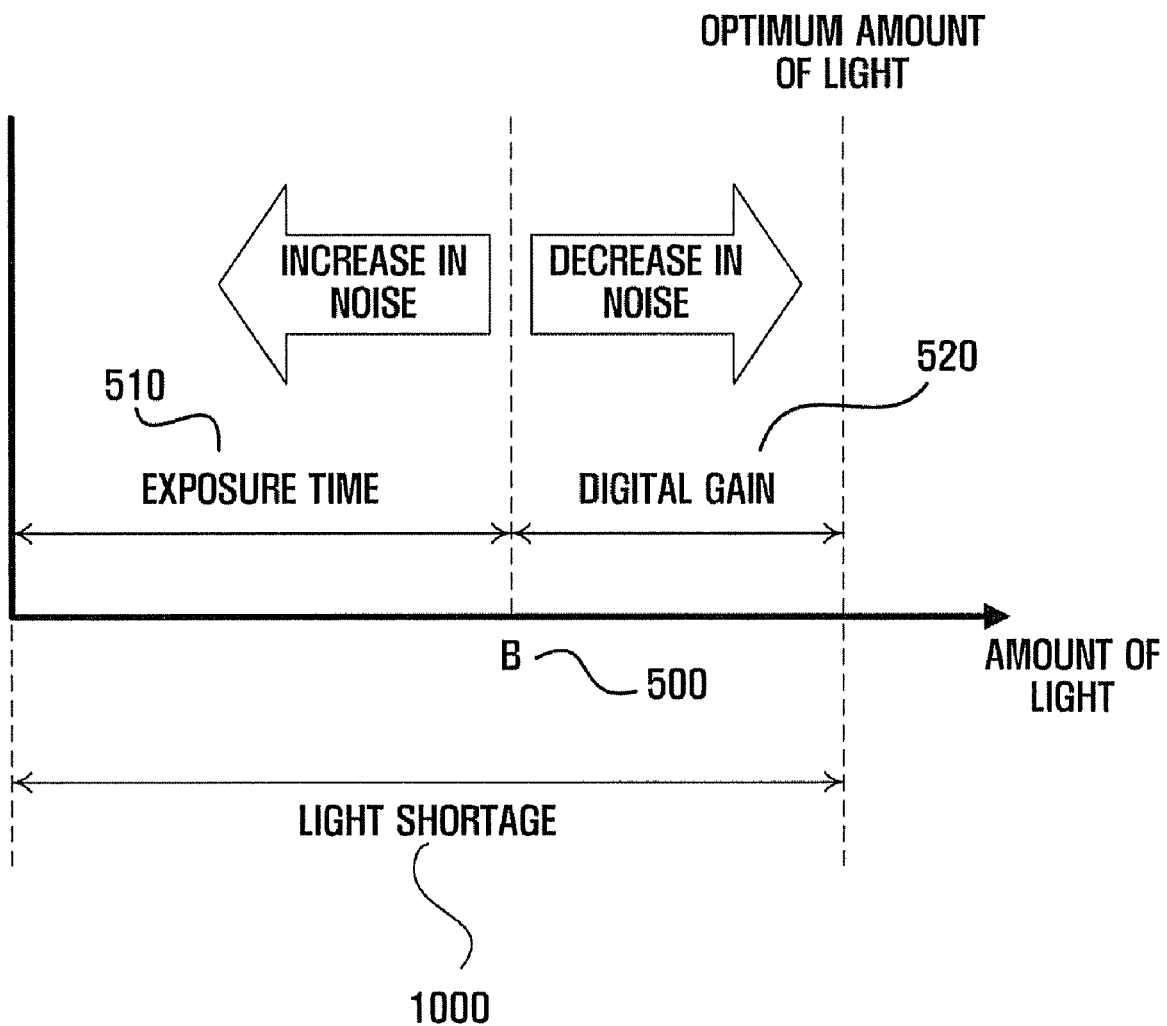
Figure 6:
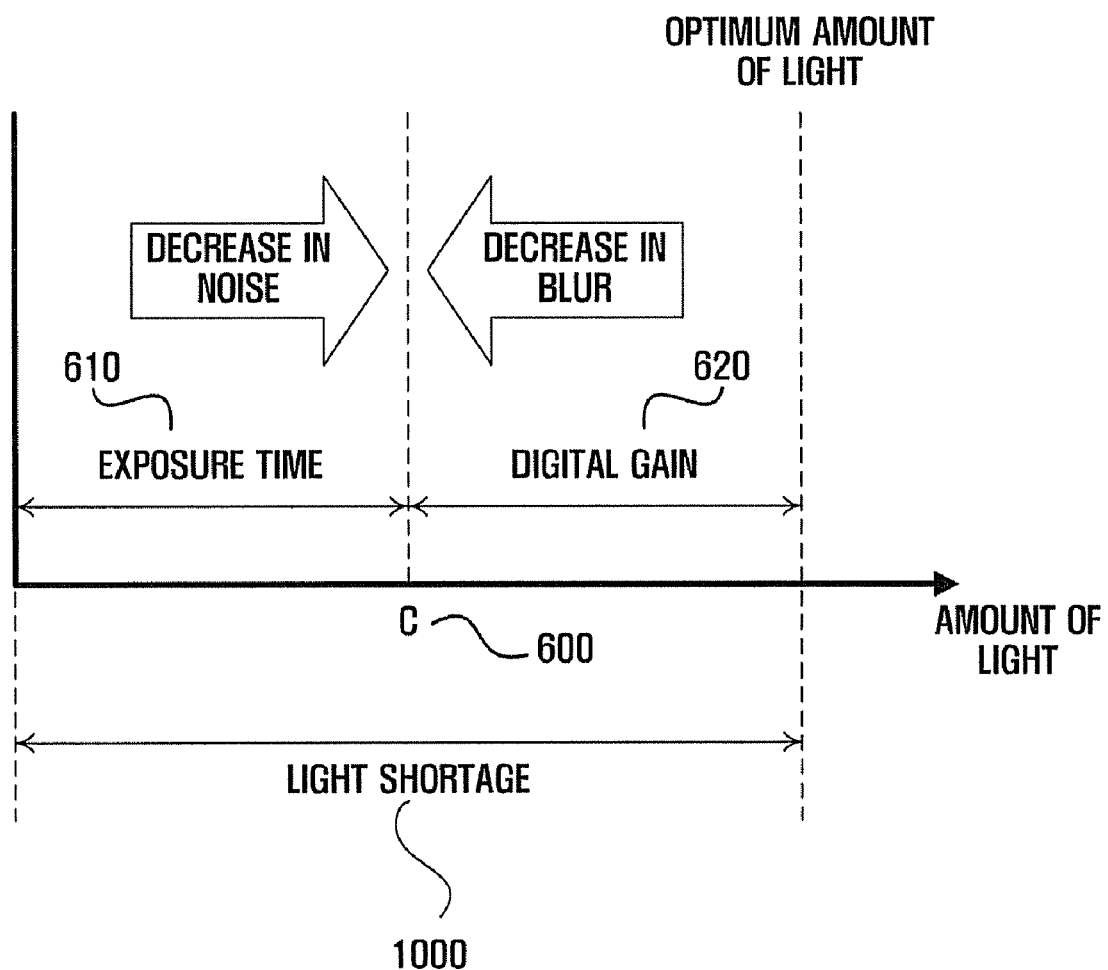

FIGS. 4 through 6 illustrate diagrams for explaining the relationship between an exposure time and digital gain.

Referring to FIG. 4, if an exposure time 410 increases when an exposure time-to-digital ratio for compensating for a light shortage 1000 is A (400), blur increases. On the other hand, if the exposure time 410 decreases, blur decreases.

Referring to FIG. 5, if digital gain 520 increases when an exposure time-to-digital ratio for compensating for a light shortage 1000 is B (500), noise increases. On the other hand, if the digital gain 520 decreases, noise decreases.

Referring to FIGS. 4 and 5, there is a correlation between an exposure time and digital gain. If one of an exposure time and digital gain is excessively high or low, the quality of an image may deteriorate. Thus, it is necessary to maintain an appropriate exposure time-to-digital gain ration.

Referring to FIG. 6, when an exposure time-to-digital gain ratio for compensating for a light shortage 1000 reaches an optimum level C (600), it is possible to realize an image with less noise and blur.

The optimum level C (600) is determined by the ratio extraction unit 143. More specifically, the ratio extraction unit 143 may extract a recognizable blur level corresponding to a sharpness level determined by the property determination unit 142 from the storage module 150, and extracts an exposure time-to-digital gain ratio corresponding to the extracted recognizable blur level from the storage module 150.

Figure 7:
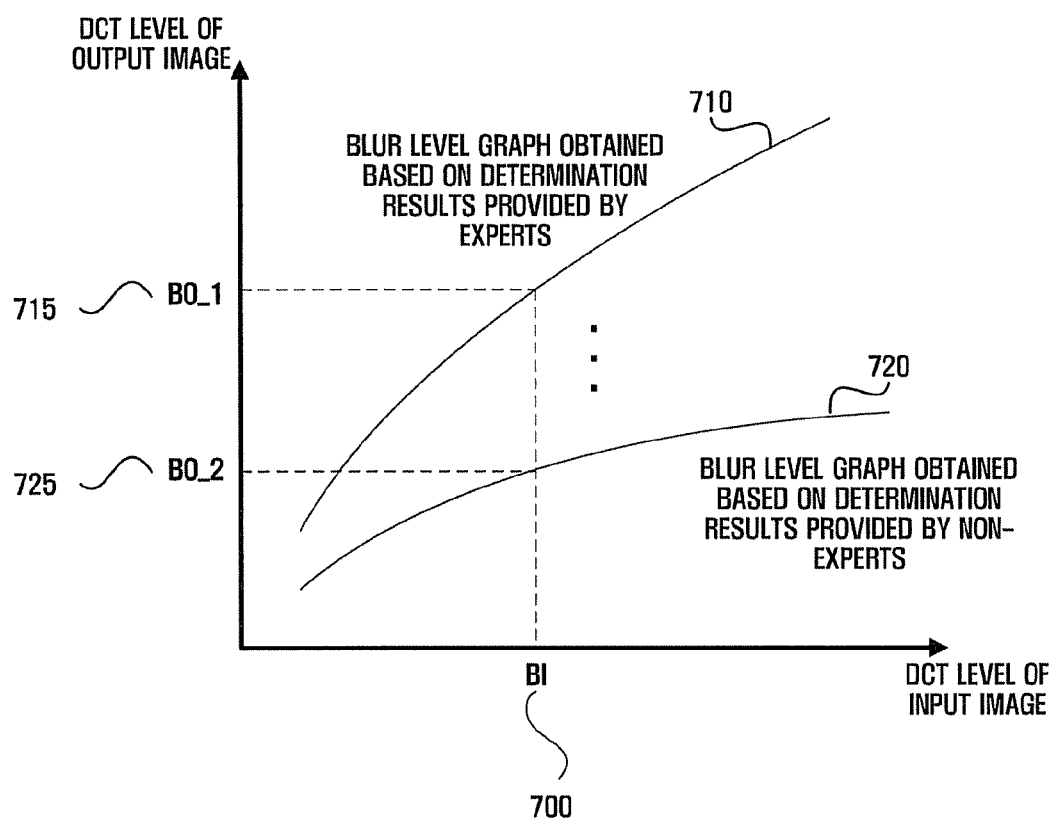
FIG. 7 illustrates blur level graphs.

FIG. 7 illustrates blur level graphs 710 and 720, which show the relationship between the sharpness of an input image and the sharpness of an output image.

Referring to FIG. 7, the blur level graph 710 may be based on decisions made by experts who have an excellent ability to recognize whether an image has been blurred, and the blur level graph 720 may be based on decisions made by non-experts.

The DCT level of an input image will hereinafter be referred to as an input DCT level, and the DCT level of an output image will hereinafter be referred to as an output DCT level. If an input DCT level is BI (700), an output DCT level may be determined to be BO_1 (715) according to the blur level graph 710, or may be determined to be BO_2 (725) according to the blur level graph 720.

The blur level graphs 710 and 720 may be included in a database of recognizable blur levels. For example, the database of recognizable blur levels may include a table presenting a number of parameters of a function for obtaining a blur level graph or showing the relationship between the input DCT level and the output DCT level.

The ratio extraction unit 143 may determine the output DCT level based on a sharpness level provided by the property determination unit 142, i.e., the input DCT level, by using whichever of the blur level graphs 710 and 720 is chosen by a user. For this, the image capturing apparatus 100 may also include an input module (not shown) which receives user input.

FIG. 7 illustrates only two blur level graphs, but the present invention is not restricted to this. That is, more than two blur level graphs may be provided, and an output DCT level corresponding to an input DCT level may be determined according to whichever of the blur level graphs is chosen by a user.

Figure 8:
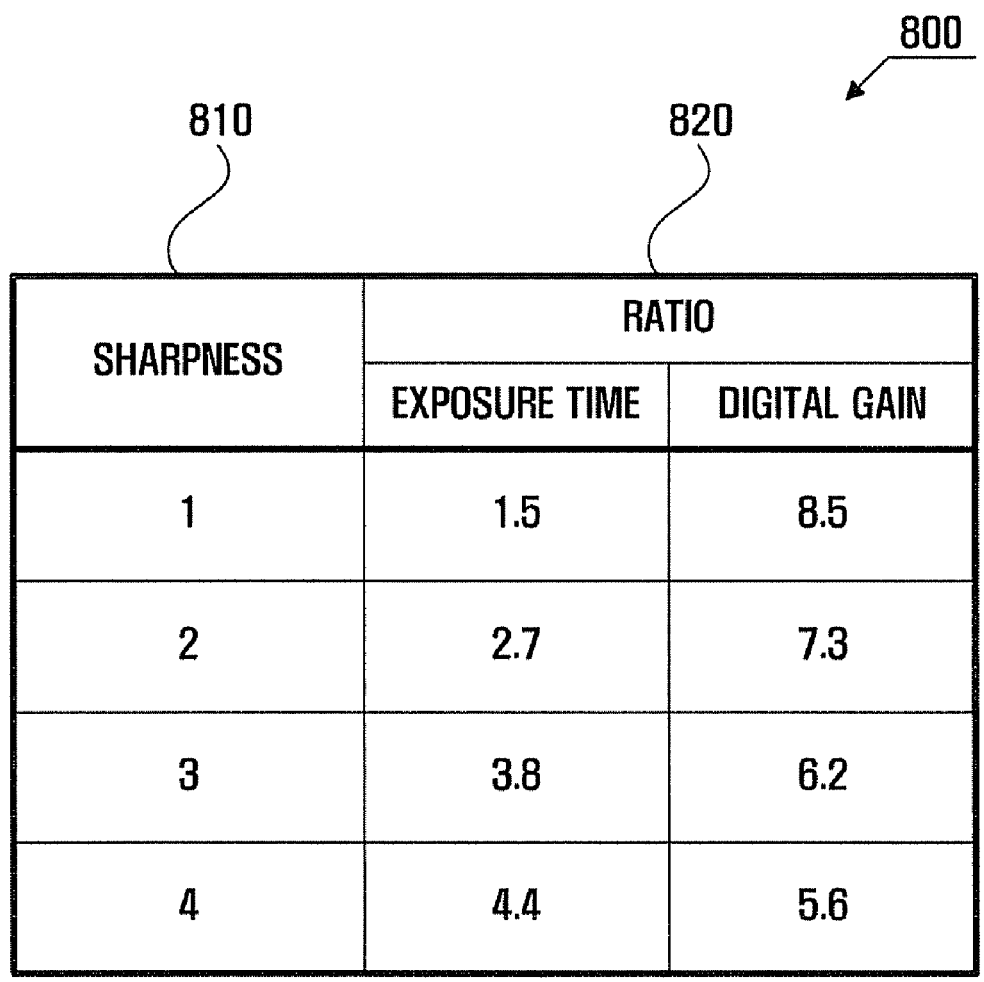
FIG. 8 illustrates a table showing the correspondence between a plurality of sharpness levels and a plurality of exposure time-to-digital gain ratios.

FIG. 8 illustrates a table showing the correspondence between a plurality of sharpness levels and a plurality of exposure time-to-digital gain ratios. Referring to FIG. 8, the table includes a sharpness field 810 and a ratio field 820.

The sharpness field 810 may present an output DCT level, which is determined by an input DCT level. That is, the ratio extraction unit 143 may determine an output DCT level corresponding to an input DCT level using one of the blur level graphs 710 and 720, and extracts an exposure time-to-digital gain ratio corresponding to the determined output DCT level from the ratio field 820.

Figure 9:
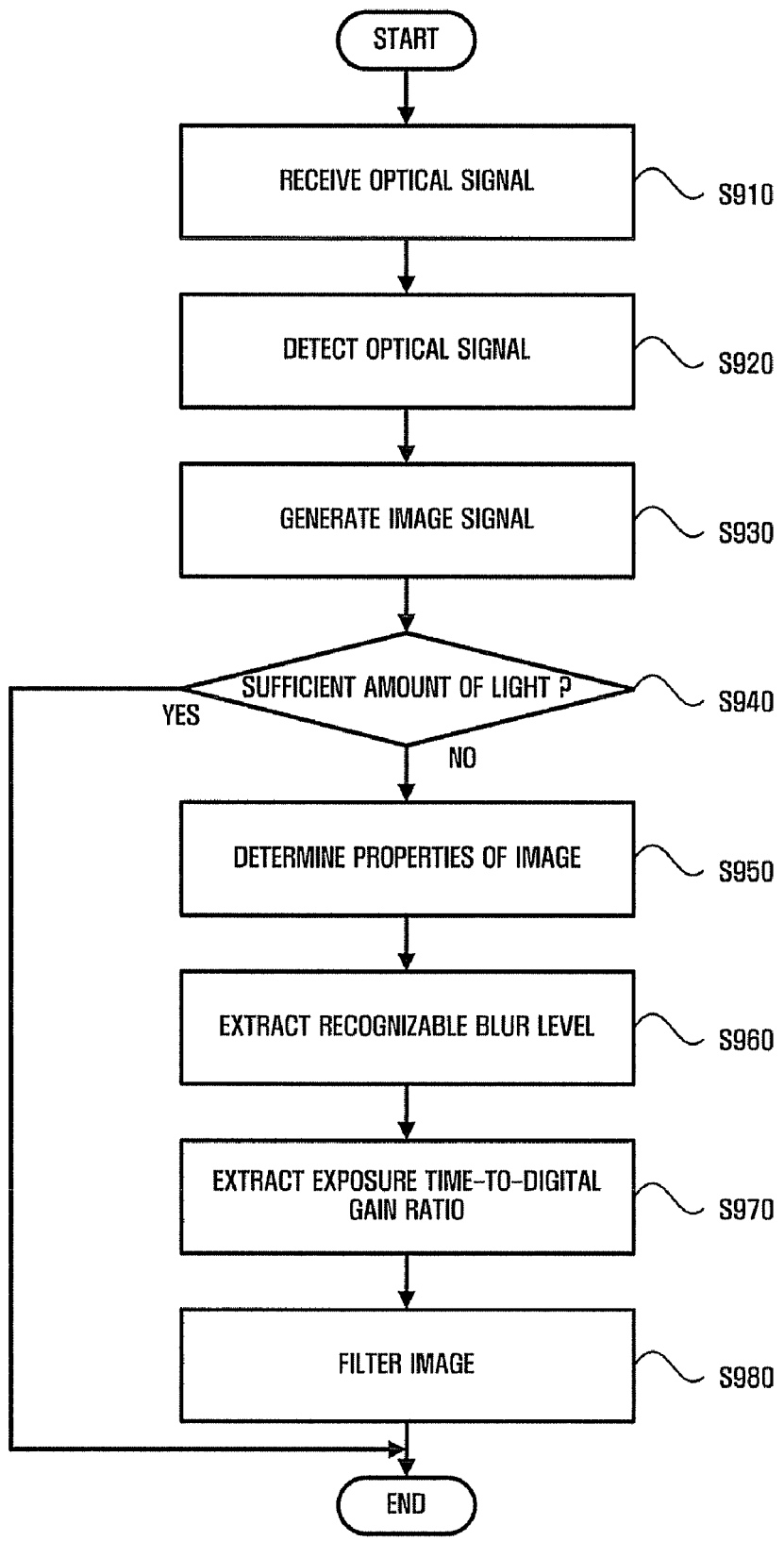
FIG. 9 illustrates a flowchart of an image capturing method according to an exemplary embodiment of the present invention.

FIG. 9 illustrates a flowchart of an image capturing method according to an exemplary embodiment of the present invention. Referring to FIG. 9, in order to extract an appropriate exposure time-to-digital gain ratio and realize an image according to the appropriate exposure time-to-digital gain ratio, the light reception module 110 receives an optical signal (S910). The optical signal is transmitted to the sensor module 120. Then, the sensor module 120 detects the optical signal (S920) and converts the optical signal into an electric signal.

While a frame is generated based on an input optical signal incident upon each pixel region, the image-signal generation module 130 generates an image signal based on the input optical signal incident upon each pixel region (S930).

The image signal generated by the image-signal generation module 130 is transmitted to the image processing module 140. The light-amount determination unit 141 of the image processing module 140 determines whether the amount of light included in the image signal is sufficient to realize an image based on the image signal (S940). That is, the light-amount determination unit 141 determines an optimum amount of light for the intensity of the image signal and determines whether the amount of light included in the image signal is greater than the optimum amount of light. If the amount of light included in the image signal is greater than the optimum amount of light, the image capturing method is terminated.

On the other hand, if the amount of light included in the image signal is less than the optimum amount of light, the property determination unit 142 determines the properties of an image configured by the image signal (S950). That is, the property determination unit 142 determines the sharpness of the image configured by the image signal. The sharpness of an image may be calculated based on the luminance DCT level of the image. The DCT level of the image configured by the image signal is transmitted to the ratio extraction unit 143.

The ratio extraction unit 143 applies a DCT level provided by the property determination unit 142 to one of the blur level graphs illustrated in FIG. 7 and thus extracts a blur level (or a DCT level) that can be tolerated by a user (S960). Thereafter, the ratio extraction unit 143 extracts an exposure time-to-digital gain ratio corresponding to the extracted blur level (S970).

The filtering unit 146 filters a number of filters corresponding to the extracted exposure time-to-digital gain ratio, i.e., a low pass filter for reducing the probability of a blur phenomenon occurring due to an increase in an exposure time and a high pass filter for reducing the probability of noise being amplified due to an increase in digital gain.

Thereafter, the filtering unit 146 filters the image configured by the image signal by using the extracted filters (S980). According to the present invention, the limit of the application of blurring to an input image is determined with the aid of a database of a plurality of recognizable blur levels, and the input image is processed by applying filtering properties corresponding to variations in digital gain and an exposure time. Therefore, it is possible to effectively realize an image by compensating for a light shortage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image capturing apparatus comprising:
a light reception module which receives an optical signal;
a sensor module which converts the optical signal into an electric signal;
an image generation module which generates an image from the electric signal; and
an image processing module which adjusts an exposure time-to-digital gain ratio by determining an amount of light included in the optical signal and a sharpness of the image,
wherein the image processing module comprises a ratio extraction unit which extracts a recognizable blur level for the image with reference to the sharpness of the image.

2. The image capturing apparatus of claim 1, wherein the image processing module comprises a light-amount determination unit which determines the amount of light included in the optical signal.

3. The image capturing apparatus of claim 1, wherein the image processing module comprises a property determination unit which determines the sharpness of the image.

4. The image capturing apparatus of claim 3, wherein the property determination unit determines the sharpness of the image by calculating a discrete cosine transform (DCT) level of the image.

5. The image capturing apparatus of claim 1, wherein the ratio extraction unit extracts the exposure time-to-digital gain ratio with reference to the extracted recognizable blur level.

6. The image capturing apparatus of claim 5, further comprising a storage module which includes a database of a plurality of recognizable blur levels.

7. The image capturing apparatus of claim 6, wherein the database is created based on a blur level graph showing a relationship between a discrete cosine transform (DCT) level of an input image and a DCT level of an output image.

8. The image capturing apparatus of claim 7, wherein the database is obtained based on the blur level graph which is made by more than one user's decisions.

9. The image capturing apparatus of claim 1, wherein the image processing module comprises a filtering unit which filters the optical signal using first and second filters corresponding to the exposure time-to-digital gain ratio.

10. The image capturing apparatus of claim 9, wherein the first filter is a low pass filter and the second filter is a high pass filter.

11. The image capturing apparatus of claim 9, further comprising a storage module which includes a database of information regarding properties of the first filter.

12. The image capturing apparatus of claim 9, further comprising a storage module which includes a database of information regarding properties of the second filter.

13. An image capturing method comprising:
receiving an optical signal;
converting the optical signal into an electric signal;
generating an image from the electric signal; and
adjusting an exposure time-to-digital gain ratio by determining an amount of light included in the optical signal and a sharpness of the image, wherein the adjusting comprises extracting a recognizable blur level for the image with reference to the sharpness of the image.

14. The image capturing method of claim 13, wherein the determining of the sharpness of the image comprises determining the sharpness of the image by calculating a discrete cosine transform (DCT) level of the image.

15. The image capturing method of claim 13, further comprising storing a plurality of recognizable blur levels in a database.

16. The image capturing method of claim 15, wherein the database is created based on a blur level graph showing a relationship between an input discrete cosine transform (DCT) level and an output DCT level.

17. The image capturing method of claim 16, wherein the database is obtained based on the blur level graph which is made by more than one user's decisions.

18. The image capturing method of claim 13, wherein the adjusting comprises extracting the exposure time-to-digital gain ratio with reference to the extracted recognizable blur level.

19. The image capturing method of claim 13, wherein the adjusting comprises filtering the optical signal using first and second filters corresponding to the exposure time-to-digital gain ratio.

20. The image capturing method of claim 19, wherein the first filter is a low pass filter and the second filter is a high pass filter.

21. The image capturing method of claim 19, further comprising storing information regarding properties of the first filter in a database.

22. The image capturing method of claim 19, further comprising storing information regarding properties of the second filter in a database.

23. An image capturing method comprising:
receiving an optical signal;
converting the optical signal into an electric signal;
generating an image from the electric signal; and
adjusting an exposure time-to-digital gain ratio by determining an amount of light included in the optical signal and a sharpness of the image,
wherein the adjusting further comprises:
extracting a recognizable blur level for the image with reference to the sharpness of the image;
extracting the exposure time-to-digital gain ratio with reference to the extracted recognizable blur level; and
filtering the optical signal using first and second filters corresponding to the exposure time-to-digital gain ratio.

\* \* \* \* \*